United States Patent
Sandberg

(10) Patent No.: US 10,634,203 B2
(45) Date of Patent: Apr. 28, 2020

(54) DISK BRAKE AND METHOD FOR MANUFACTURING THE SAME

(71) Applicant: Haldex Brake Products AB, Landskrona (SE)

(72) Inventor: Stefan Sandberg, Lomma (SE)

(73) Assignee: Haldex Brake Products AB (SE)

( * ) Notice: Subject to any disclaimer, the term of this patent is extended or adjusted under 35 U.S.C. 154(b) by 27 days.

(21) Appl. No.: 16/065,576

(22) PCT Filed: Dec. 22, 2016

(86) PCT No.: PCT/EP2016/082491
§ 371 (c)(1),
(2) Date: Jun. 22, 2018

(87) PCT Pub. No.: WO2017/109138
PCT Pub. Date: Jun. 29, 2017

(65) Prior Publication Data
US 2019/0257379 A1  Aug. 22, 2019

(30) Foreign Application Priority Data
Dec. 22, 2015  (EP) .................................... 15202215

(51) Int. Cl.
*F16D 65/56* (2006.01)
*F16D 65/097* (2006.01)
(Continued)

(52) U.S. Cl.
CPC ............ *F16D 65/567* (2013.01); *B60T 13/02* (2013.01); *B60T 17/08* (2013.01); *F16D 55/226* (2013.01);
(Continued)

(58) Field of Classification Search
CPC .... F16D 55/30; F16D 65/567; F16D 65/0972; F16D 66/026; F16D 55/2255;
(Continued)

(56) References Cited

U.S. PATENT DOCUMENTS 4,727,963 A * 3/1988 Villata ................ F16D 55/2245
188/196 D
5,788,022 A * 8/1998 Antony .................. F16D 65/18
188/196 D (Continued)

FOREIGN PATENT DOCUMENTS

DE     202010015910 U1    2/2011
DE     202014002459 U1    2/2011

(Continued)

*Primary Examiner* — Thomas W Irvin
(74) *Attorney, Agent, or Firm* — St. Onge Steward Johnston & Reens LLC

(57) ABSTRACT

The present invention refers to a disc brake having a brake caliper, which overlaps at least one brake disc, and a brake actuation mechanism having an amplification mechanism including a brake lever being rotatable around a pivot bearing for introducing a clamping force from an actuator, the brake lever having an arm extending between its actuator connection means and its transmission means, a thrust element in connection with said transmission means for transmitting the amplified clamping force onto the brake disc, in which the brake lever comprises a recess between its actuator connection means and its transmission means, which recess is traversed by the axis of said pivot bearing.

15 Claims, 7 Drawing Sheets

(51) Int. Cl.
*F16D 66/02* (2006.01)
*F16D 65/18* (2006.01)
*F16D 55/226* (2006.01)
*B60T 13/02* (2006.01)
*B60T 17/08* (2006.01)
*F16D 125/36* (2012.01)
*F16D 125/64* (2012.01)

(52) U.S. Cl.
CPC ......... *F16D 65/0972* (2013.01); *F16D 65/18* (2013.01); *F16D 66/026* (2013.01); *F16D 2125/36* (2013.01); *F16D 2125/64* (2013.01)

(58) Field of Classification Search
CPC ...... F16D 55/226; F16D 55/60; F16D 65/097; F16D 65/18; F16D 65/183; F16D 65/56; F16D 2125/582
USPC .............................................. 188/72.7, 72.9
See application file for complete search history.

(56) References Cited

U.S. PATENT DOCUMENTS

| | | | | |
|---|---|---|---|---|
| 6,698,553 | B2 * | 3/2004 | Varela | F16D 65/18 188/72.6 |
| 7,204,351 | B2 * | 4/2007 | Sandberg | F16D 65/0043 188/196 V |
| 8,590,675 | B2 * | 11/2013 | Jungmann | F16D 65/18 188/71.9 |
| 9,010,502 | B2 * | 4/2015 | Roberts | F16C 11/0623 188/72.9 |
| 9,453,545 | B2 * | 9/2016 | Jungmann | F16D 65/18 |
| 9,803,711 | B2 * | 10/2017 | Sandberg | F16D 55/227 |
| 9,903,431 | B2 * | 2/2018 | Drewes | F16D 65/28 |
| 10,066,692 | B2 * | 9/2018 | Sandberg | F16D 65/18 |
| 10,145,433 | B2 * | 12/2018 | Jackson | F16D 55/226 |
| 10,221,907 | B2 * | 3/2019 | Sandberg | F16D 65/18 |
| 10,221,908 | B2 * | 3/2019 | Henning | F16D 65/567 |
| 10,309,472 | B2 * | 6/2019 | Klaas | F16D 65/18 |
| 10,544,845 | B2 * | 1/2020 | Welin | F16D 65/183 |
| 2013/0008749 | A1 * | 1/2013 | Sandberg | F16D 55/227 188/71.8 |
| 2014/0250662 | A1 * | 9/2014 | Sandberg | F16D 55/227 29/428 |
| 2016/0017946 | A1 * | 1/2016 | Sandberg | F16D 65/18 188/71.8 |
| 2016/0273603 | A1 * | 9/2016 | Sandberg | F16D 55/227 |
| 2019/0011000 | A1 * | 1/2019 | Welin | F16D 55/226 |
| 2019/0249733 | A1 * | 8/2019 | Welin | B60T 1/065 |

FOREIGN PATENT DOCUMENTS

| | | |
|---|---|---|
| EP | 2988016 A1 | 2/2016 |
| WO | 201111354 A2 | 9/2011 |

* cited by examiner

DISK BRAKE AND METHOD FOR MANUFACTURING THE SAME

FIELD OF THE INVENTION

The present invention relates to a disc brake, in particular for a utility vehicle, and to a method for manufacturing and assembly, respectively, of such a disc brake.

BACKGROUND OF THE INVENTION

In this application, it will be understood by those of skill in the art that the invention encompasses disc brakes which either comprise a sliding caliper or a fixed caliper, which overlap one or more brake discs. Mainly but not exclusively the invention relates to spot-type disc brakes.

Disc brakes, in particular for heavy load trucks, typically comprise various actuation mechanism configurations with respect to the manner in which the transmission of the braking force is transferred onto one or several brake discs and with respect to the type of adjustment utilized for compensating for brake lining wear.

SUMMARY OF THE INVENTION

With respect to the brake actuation mechanism, the present invention shall preferably, but not exclusively, relate to a single tappet design as it is known e.g. from International patent application WO 2011/113554 A2 of the applicant, in which the elements of the return mechanism and the adjustment mechanism are incorporated into the tappet design and surrounded by the unit consisting of the outer and inner sleeves, which both form part of the adjustment mechanism and thus brake actuation mechanism. The adjustment mechanism incorporated therein is driven by a rotatable lever, which introduces the clamping force from an actuator into the brake actuation mechanism. The rotatable lever is arranged such that the introduction of the clamping force into the elements of the brake actuation mechanism, e.g. the thrust element and the adjuster, is directed more or less in axial direction in relation to the brake disc, i.e. in a direction substantially parallel to the rotation axis of the brake disc; the lever thus basically rotates towards the brake disc.

In contrast thereto, in a radial-type brake the rotatable lever is arranged in such a way that the clamping force is introduced into the brake actuation mechanism radially with respect to the brake disc, i.e. in a direction substantially perpendicular to the rotation axis of the brake disc; the lever thus basically rotates towards the brake disc axis. In this regard, the present invention shall preferably, but not exclusively, refer to disc brakes of the radial type.

Independent from the actual design of the brake actuation mechanism to be employed in this connection, the invention aims for a new configuration and arrangement of the rotatable lever, which allows for a more compact design of the disc brake.

A further object can be seen in the provision of a brake actuation mechanism which is easy to assemble and the single components of which can be manufactured in an easy and cost-effective manner.

These objects, respectively, are solved by a disc brake according to appended independent claim and by a method for manufacturing such a disc brake according to the dependent claims.

According to the invention a disc brake is proposed which comprises a brake caliper, the brake caliper overlapping at least one brake disc, and a brake actuation mechanism having an amplification mechanism comprising a brake lever being rotatable around a pivot bearing for introducing a clamping force from an actuator, the brake lever having an arm extending between its actuator connection means and its transmission means, a thrust element in for transmitting the disc, connection with said transmission means amplified clamping force onto the brake in which the brake lever comprises a recess between its actuator connection means and its transmission means, which recess is traversed by the axis of said pivot bearing.

The recess thereby shall preferably be configured in a closed-loop design extending between the actuator connection means of the lever, usually a concavely shaped reception for receiving the distal end of a piston from the actuator, which could be of the pneumatic, electro-mechanical or hydraulic type or similar, and the transmission means, usually a half-cylindrical extension or end, with which the lever is supported against a correspondingly shaped bearing shell or similar of the adjacent thrust piece, cross bar or similar in a swiveling manner.

The closed-loop design of the recess provides a better rigidity of the lever, the latter thus, in relation to its lever arm, which rotates in relation to the thrust element, can be made with less material and thus reduced weight and still offering the same stability for taking up the torque from the actuator.

Such design and configuration of the brake lever according to the invention can be used both for disc brakes of the axial type and of the radial type as described above.

According to one preferred embodiment referring to disc brakes of the radial type, the brake lever shall be configured and arranged in relation to the thrust element so that the clamping force from the actuator is substantially directed perpendicularly to the axis of the brake disc upon brake actuation.

According to a different preferred embodiment referring to disc brakes of the single tappet design, the amplification mechanism and the thrust element shall be mounted in functional cooperation in the brake caliper by means of a rod, which rod is supported in the housing of the brake caliper so as to be not displaceable in axial direction, when assembled.

Preferably, the rod extends with its end, which faces away from the brake rod disc and which is directed towards the rear housing section of the brake caliper, into said recess of the brake lever.

The brake actuation mechanism with all its single components shall be configured and arranged in such a way that the cooperation with the rod basically may be realized as this is described in detail in the International patent application WO 2011/113554 A2 in the name of the applicant, the disclosure of which shall herewith be exclusively included by reference.

In other words, the rod shall serve as the mounting means which keeps the single components of the brake actuation mechanism, such as the amplification mechanism, the adjuster, the thrust element, the return or reset device and the lever, together in functional cooperation, wherein these components could be split into different self-supporting sub-modules or units for assembly purposes. In particular the rod serves to also mount the single brake components in the housing of the brake caliper in such a way that these components do act in parallel to the rotational axis of the brake disc.

The rod can be configured such that it will be fixed in the housing of the brake caliper to be non-movably supported in axial direction.

For that purpose the disc brake according to the invention further comprises a mounting brace having means for receiving said rod in a fixed manner, said mounting brace traversing said recess of the brake lever in the assembled state of the brake actuation mechanism.

These means of the mounting brace could be configured to allow a force-fit and/or form-fit with the rod.

According to one embodiment, the free end of the rod facing away from the brake disc comprises a threaded outer surface, while the mounting brace comprises a threaded opening, so that the end of the rod could be simply screwed into that opening.

According to another embodiment, the rod and the mounting brace could comprise engagement means of different kind which are complementary in shape and dimension so as to allow a fixed connection between the rod and the mounting brace.

In order to allow disassembly of the brake actuation mechanism e.g. during overhaul works, the mounting brace is designed to be releasably fixed in the brake caliper. Accordingly, the connection between the rod and the mounting brace can be released as well, if needed.

For that purpose the brake caliper comprises a recess for receiving one end of said mounting brace and directly opposite to said recess a lateral opening for introducing the mounting brace into the brake caliper. During assembly, the mounting brace could be easily introduced through said lateral opening into the caliper, traversing the recess of the brake lever and becoming supported in the correspondingly shaped recess at a corresponding position at the inner wall of the brake caliper interior, which receives the mounting brace. Further details of such configuration become apparent in connection with the description of the method of assembly further down below.

According to a preferred embodiment of the invention, the brake lever, be it of axial-type or radial-type arrangement, shall be configured to be mounted at different angular positions around the axis of the rod.

In other words, the brake lever with its recess can be mounted in an angular position in relation to the rod, and thus in relation to the brake disc and the thrust element, to allow, in correspondence with an adapted design of the housing of the brake caliper, adaptation to different spatial constraints around the wheel axle and surrounding chassis, which may exist for different vehicles, e.g. cross-road trucks or low-floor buses.

The invention furthermore relates to a method for manufacturing or assembly of such a disc brake as described above.

Therefore, the invention proposes a method for manufacturing a disc brake, which comprises a brake caliper, which overlaps at least one brake disc, and a brake actuation mechanism having an amplification mechanism comprising a brake lever being rotatable around a pivot bearing for introducing a clamping force from an actuator, the brake lever having an arm extending between its actuator connection means and its transmission means, in which the brake lever further comprises a recess between its actuator connection means and its transmission means, which recess is traversed by the axis of said pivot bearing;

a thrust element in connection with said transmission means for transmitting the amplified clamping force onto the brake disc, wherein the amplification mechanism with the brake lever and the pivot bearing are mounted in functional cooperation as a self-supporting first unit by means of a rod; comprising the steps of inserting the first unit into the brake caliper through an opening from the brake disc-side;

inserting a mounting brace through a lateral opening in the brake caliper such that the mounting brace traverses the recess of the brake lever;

connecting the end of the rod, the end facing the rear of the brake caliper, with the mounting brace.

In one embodiment, the mounting brace comprises a threaded opening and the end of the rod comprises a thread to fit into that threaded opening, so that the method further comprises the steps of applying a rotatable mounting tool at the side of the rod being axially opposite to its threaded end; and rotating the rod so as to screw its threaded end into the threaded opening of the mounting brace.

After the first unit has been placed with the rod into the interior of the brake caliper shortly before the end of the rod engages with the opening of the mounting brace in a threaded manner, while both the first unit with the rod and the mounting brace will be placed in a corresponding alignment, a tool is applied to the brake disc-side end of the rod to rotate the latter. For that purpose, the brake disc-side end of the rod may comprise corresponding means at its face side for connecting to said tool, such as e.g. a socket.

The method according to the invention still further comprises the steps of attaching a second unit comprising the thrust element to the brake disc-side end of the first unit, the thrust element comprising an inner thread and the brake disc-side end of the first unit comprising an outer thread; and activating a reset device being in connection with the first unit thereby screwing the second unit onto the first unit.

For example, as a reset device a manually or machine operated reset device may be understood, which comprises an adjustment pinion in cooperation with the adjustment mechanism to return the latter for the purpose of brake pad change. Such reset device is e.g. described in the abovementioned WO 2011/113554 A2 of the applicant, to which reset device it is herewith explicitly referred to.

According to another embodiment of the invention, the method for manufacturing a disc brake, which comprises a brake caliper, which overlaps at least one brake disc, and a brake actuation mechanism having an amplification mechanism comprising a brake lever being rotatable around a pivot bearing for introducing a clamping force from an actuator, the brake lever having an arm extending between its actuator connection means and its transmission means, in which the brake lever further comprises a recess between its actuator connection means and its transmission means, which recess is traversed by the axis of said pivot bearing;

a thrust element in connection with said transmission means for transmitting the amplified clamping force onto the brake disc, wherein the amplification mechanism with the brake lever and the pivot bearing and the thrust element are mounted in functional cooperation as a self-supporting unit by means of a rod;

comprises the steps of inserting the unit into the brake caliper through an opening from the brake disc-side;

inserting a mounting brace through a lateral opening in the brake caliper such that the mounting brace traverses the recess of the brake lever; and connecting the end of the rod, the end facing the rear of the brake caliper, with the mounting brace thereby enabling a form-fit and/or a force-fit.

In particular to allow such form fit, the rod may comprise engagement means and the mounting brace may comprise engagement means being complementary therewith, so that the method according to this embodiment could further comprise the step of laterally shifting the mounting brace over the end of the rod thereby bringing the engagement means of both the mounting brace and the rod into engagement.

In this engagement position, the rod and thus the entire brake actuation mechanism are mounted in the final working position in the brake caliper.

The brake actuation mechanism may further comprise an adjustment mechanism and a return device cooperating with said adjustment mechanism, the return device comprising a return spring element, wherein the adjustment mechanism, the return device with the spring element, the amplification mechanism with the brake lever and the pivot bearing and the thrust element are mounted in functional cooperation as a self-supporting unit by means of said rod.

The return device is configured so that in the assembled condition of the brake actuation mechanism the spring element is set under pretension thereby forming a defined torque limit for a torque clutch of the adjustment mechanism, by exerting permanently a spring force in axial direction onto the torque clutch.

In this respect, the method may thus further comprise the step of displacing the rod in axial direction upon laterally shifting said mounting brace over the end of the rod, and thereby applying a defined pretension to said return spring element.

By that the rod will be fixed in the mounting brace, which is basically arranged closer to the rear side of the housing section of the brake caliper, and thereby sets the spring element of the return device, which is basically arranged axially opposite thereto on the rod, under the desired pretension. Also with respect thereto, reference shall be made to the disclosure of WO 2011/113554 A2 of the applicant.

BRIEF DESCRIPTION OF THE DRAWINGS

Further advantages and features of the present invention do become apparent with respect to the embodiments shown in the attached drawings, in which.

DETAILED DESCRIPTION OF THE INVENTION

Figure 1:
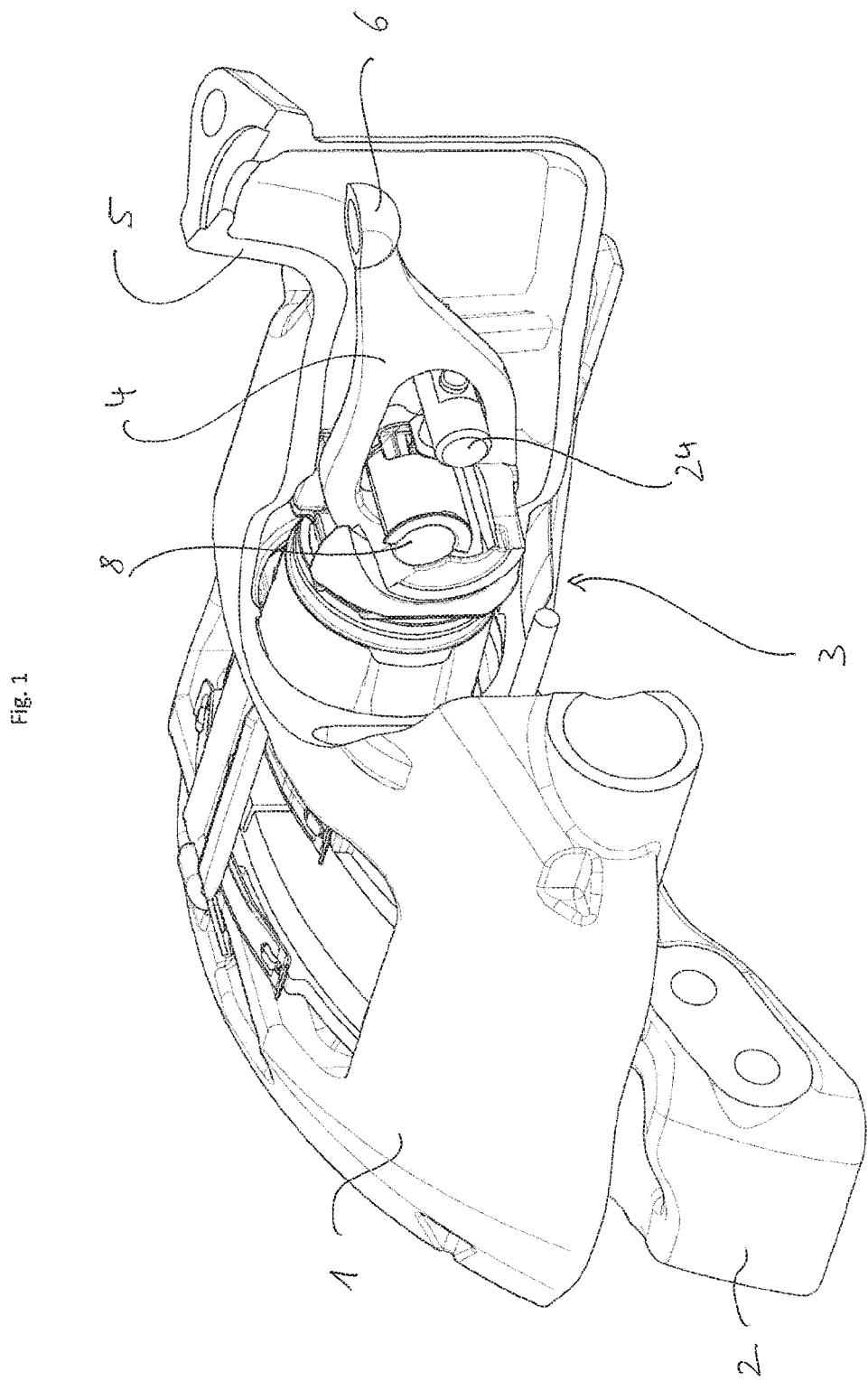
FIG. 1 is a perspective, partially cut-out view of a brake caliper containing a brake actuation mechanism with a brake lever according to the invention.

FIG. 1 shows the disc brake according to the invention in perspective view with its substantial components, which are shown in their assembled state.

The disc brake comprises a brake caliper 1 which is slideably guided on a carrier 2. The brake caliper 1 receives a brake actuation mechanism 3 preferably, but not exclusively, of that kind as it is described in WO 2011/113554 A2.

The brake actuation mechanism 3 comprises a brake lever 4, which is arranged in an extended, neck-like rear housing section 5 of the brake caliper 1 such that the clamping force exerted by a not-shown actuator onto actuator connection means 6 of the brake lever 4 will be directed substantially perpendicularly with respect to the axis of a brake disc (not shown). The lever 4 thus swivels around some degrees horizontally in relation to the brake disc axis.

The brake actuation mechanism 3 according to the invention is designed in such a way that it on the one hand enables a simple assembly in the brake caliper 1 and on the other hand realizes a faultless functioning with at the same time compact configuration due to the specific arrangement of the single components in relation to each other.

Figure 2:
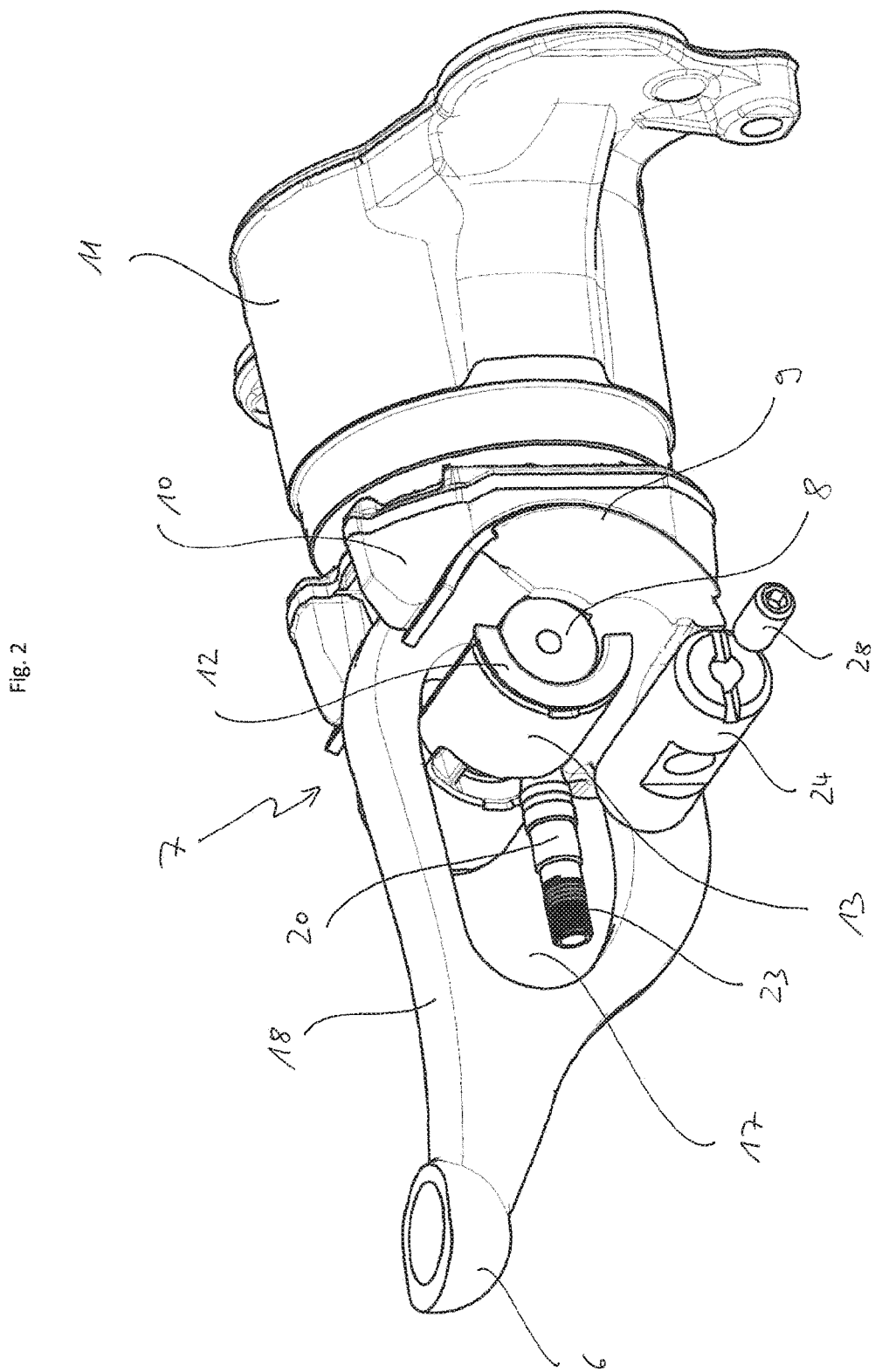
FIG. 2 is a perspective view of the brake actuation mechanism with a dismounted mounting brace.

In FIG. 2 the brake actuation mechanism 3 is shown as such.

It comprises an amplification mechanism 7, which introduces the clamping force originating from an hydraulic, pneumatic or electro-mechanical actuator (not shown herein) into the brake actuation mechanism 3 and thereby enforcing it in correspondence with a gear ratio being determined by its construction. This is achieved in that the brake lever 4 is pivotably supported against two cylindrical rollers 8, which rollers 8 are eccentrically arranged with respect to transmission means 9 of the brake lever 4, with which transmission means 9 the brake lever 4 is rotatably supported against a force-transmitting block 10, the force-transmitting block 10 being in attachment with a thrust element 11.

The thrust element 11 itself is linearly axially guided in the brake caliper 1 so as to advance towards the brake disc upon rotation of the brake lever 4.

The cylindrical rollers 8 are rotatably received in a corresponding needle bearing cage 12, which is arranged in two support cups 13, thereby forming an eccentric pivot bearing 14 for the brake lever 4.

Figure 3:
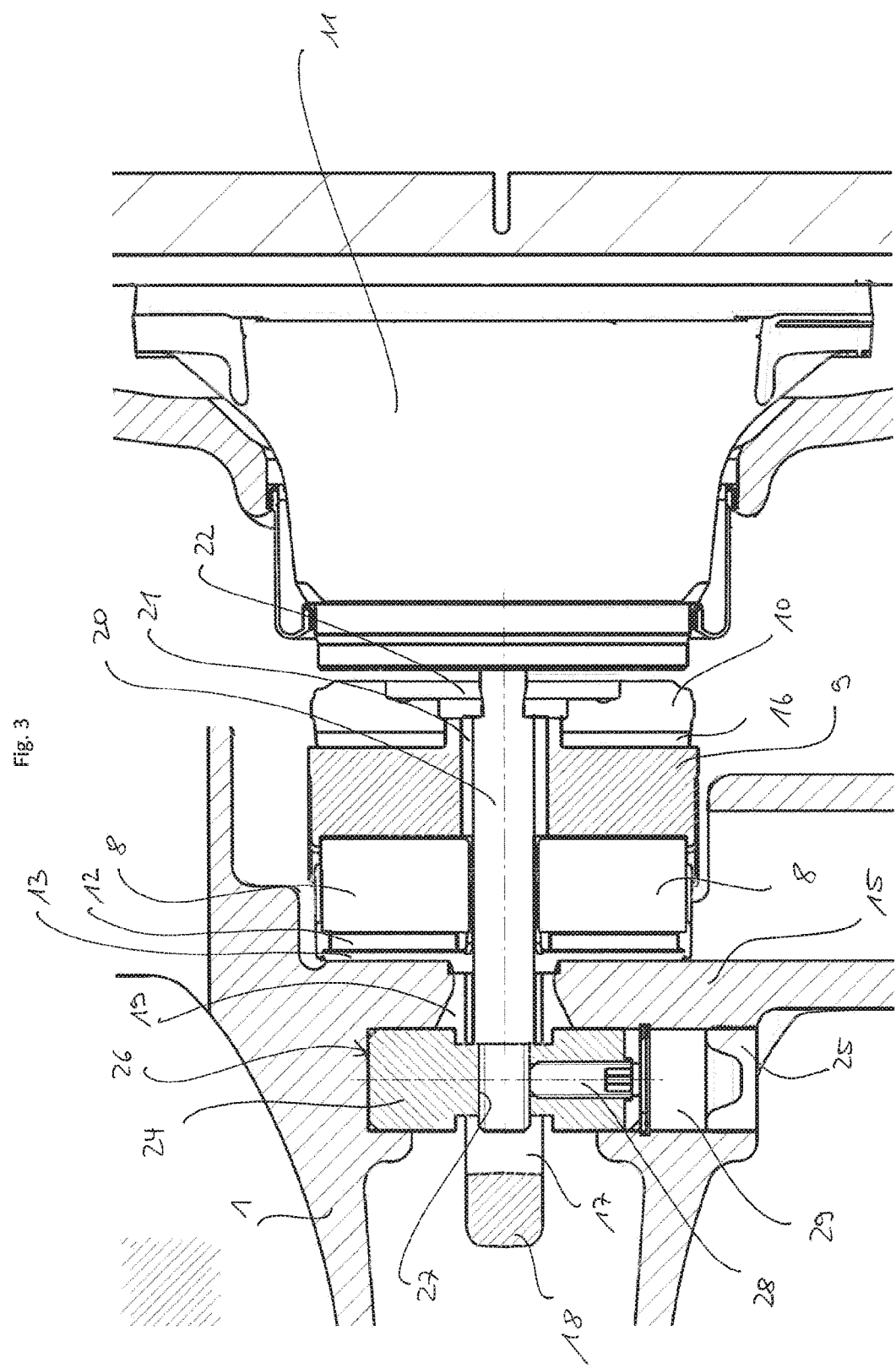
FIG. 3 is a partial horizontal cross-sectional view of the brake actuation mechanism.
Figure 4:
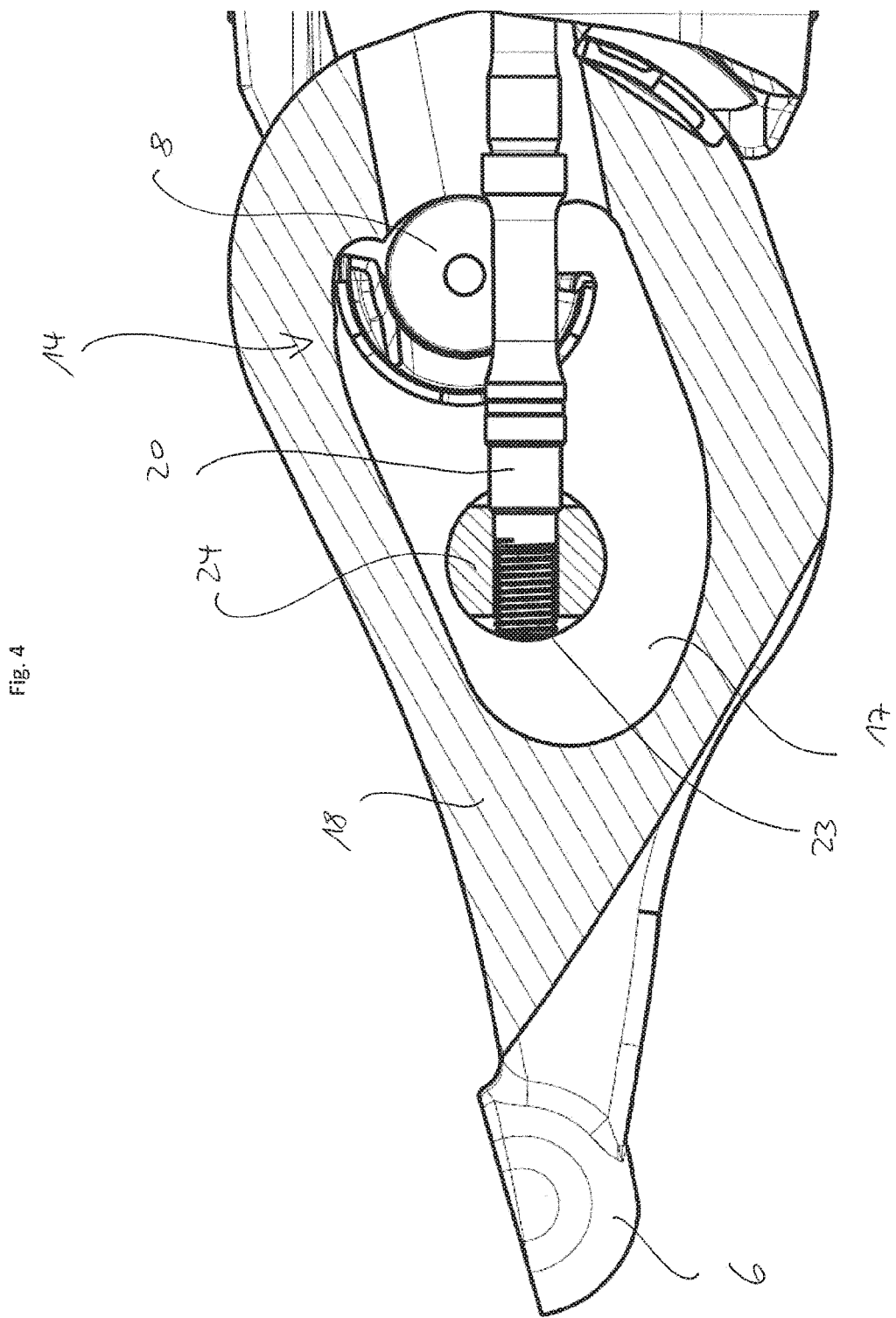
FIG. 4 is a partial vertical cross-sectional view of the lever part of the brake actuation mechanism.

The support cups 13 are supported against a traverse housing section 15 of the brake caliper 1, as can best be seen in FIG. 3.

The brake lever 4 is designed and configured in relation to the eccentric pivot bearing 14 such that upon a pivoting movement around the rollers 8 an eccentric displacement of the lever 4, namely of its transmission means 9 in relation to the rollers 8 takes place, which eccentric displacement or offset results in an enforcement of the force being introduced from the actuator into the lever 4.

Opposite to the rollers 8 the brake lever 4 is supported against the force-transmitting block 10 via further needle bearing cups 16. The force-transmitting block 10 is formed as one piece, preferably as a casted or forged component, and comprises on the side of the lever two substantially half cup-type recesses which serve for receiving the needle bearing cups 16. At the side of the brake disc the force-transmitting block 10 is formed with planar surfaces in order to abut against the thrust element 11 or any component of an adjuster mechanism (not shown) being received in the interior of the 15 thrust element 11.

According to the invention, as can be seen in particular in FIGS. 1, 2, 4, 5 and 6, the brake lever 4 comprises a recess 17, which recess 17 is arranged and extends between the actuator connection means 6 and the transmission means 9. The recess 17 is basically formed as a closed loop, which allows for certain strength capabilities of the lever performance.

The arrangement of the brake lever 4 inside the housing of the caliper 1, in particular inside its extended section 5 is such that the axis of the pivot bearing 14 traverses the recess 17, as well as the traverse housing section 15 of the brake caliper 1 supporting said pivot bearing 14 traverses said recess 17.

This allows for a very compact design also for disc brakes of the radial type-actuation.

The brake lever 4 being made preferably as one-piece itself is split into a part of a lever arm 18, which extends with a small width to the rear of the brake caliper 1 and which basically comprises the recess 17, and into the front, brake-disc side transmission means 9, which is substantially greater in lateral width than the lever arm part 18, as can best be seen in FIG. 3.

To enable the desired compact design, the brake lever 4 of such design shall be introduced into the interior of the brake caliper 1 from the brake disc side. For that purpose, the traverse housing section 15 comprises an opening 19 through which the lever arm 18 can be inserted to swivel freely within said opening 19, while the wider transmission means 9 stay in front of the traverse housing section 15.

The brake actuation mechanism 3 comprises a centrally arranged rod 20.

As already explained above, according to the invention, in particular the rod 20 serves to keep the amplification mechanism 7 and/or a not-shown adjustment device and/or the thrust element 11 and/or a not-shown return device together as a self-supporting assembly unit, either all components as one single module or several components as separate sub-modules, each as pre-mounted self-supporting assembly units, for assembly purposes, while the central rod 20 is aligned co-axially to the axis of the brake disc.

As it becomes apparent from the following the rod 20 serves as mounting means for the single assembly groups of the brake actuation mechanism 3 on the one hand and as fixation means for the brake actuation mechanism 3 in the housing of the brake caliper 1 on the other.

As can be best seen in FIG. 3, for the passage of the central rod 20 the transmission means 9 of the lever 4 comprises an opening 21 and the force-transmitting block 10 comprises an opening 22, whereas the rollers 8 and the needle bearing cages 12 with the bearing cups 13 are arranged to both sides of the rod 20 at corresponding positions, respectively.

Furthermore, the rod 20 freely traverses the opening 19 in the traverse housing section 15 of the brake caliper 1 and extends with its rear end into the recess 17 of the brake lever 4, as can best be seen in FIG. 2. Basically, the rod 20 is positioned in the plane being defined by said recess 17.

At its rear end facing away from the brake disc the rod 20 comprises a thread 23.

In the assembled state of the brake actuation mechanism 3, the threaded end 23 of the rod 20 is cooperating with a mounting brace 24.

The mounting brace 24, which preferably comprises a rotationally symmetric shape, serves to fix the rod 20 and thereby the entire brake actuation mechanism 3 inside the housing of the brake caliper 1, while the mounting brace 24 traverses the recess 17 of the brake lever 4.

For that purpose, the brake caliper 1 comprises at a corresponding position a lateral opening 25, through which the mounting brace 24 can be inserted upon assembly. Opposite to that lateral opening 25 and axially aligned thereto a rotationally symmetric recess 26 is provided at the inner wall 30 of the brake caliper 1, as can best be seen in FIG. 3.

In the final position of the mounting brace 24, a threaded passage 27 of it is aligned with the mounting orientation of the rod 20, so that the threaded end 23 of the rod 20 can be screwed into that threaded passage 27.

In order to prevent that such threaded engagement could become loose, e.g. due to vibrations, a counter-screw 28 can be provided and axially inserted into a corresponding threaded axial opening in the mounting brace 24 so as to further block the threaded end 23 of the rod 20.

The lateral opening 25 in the brake caliper 1 can be then closed by a corresponding sealing cup 29.

Figure 5:
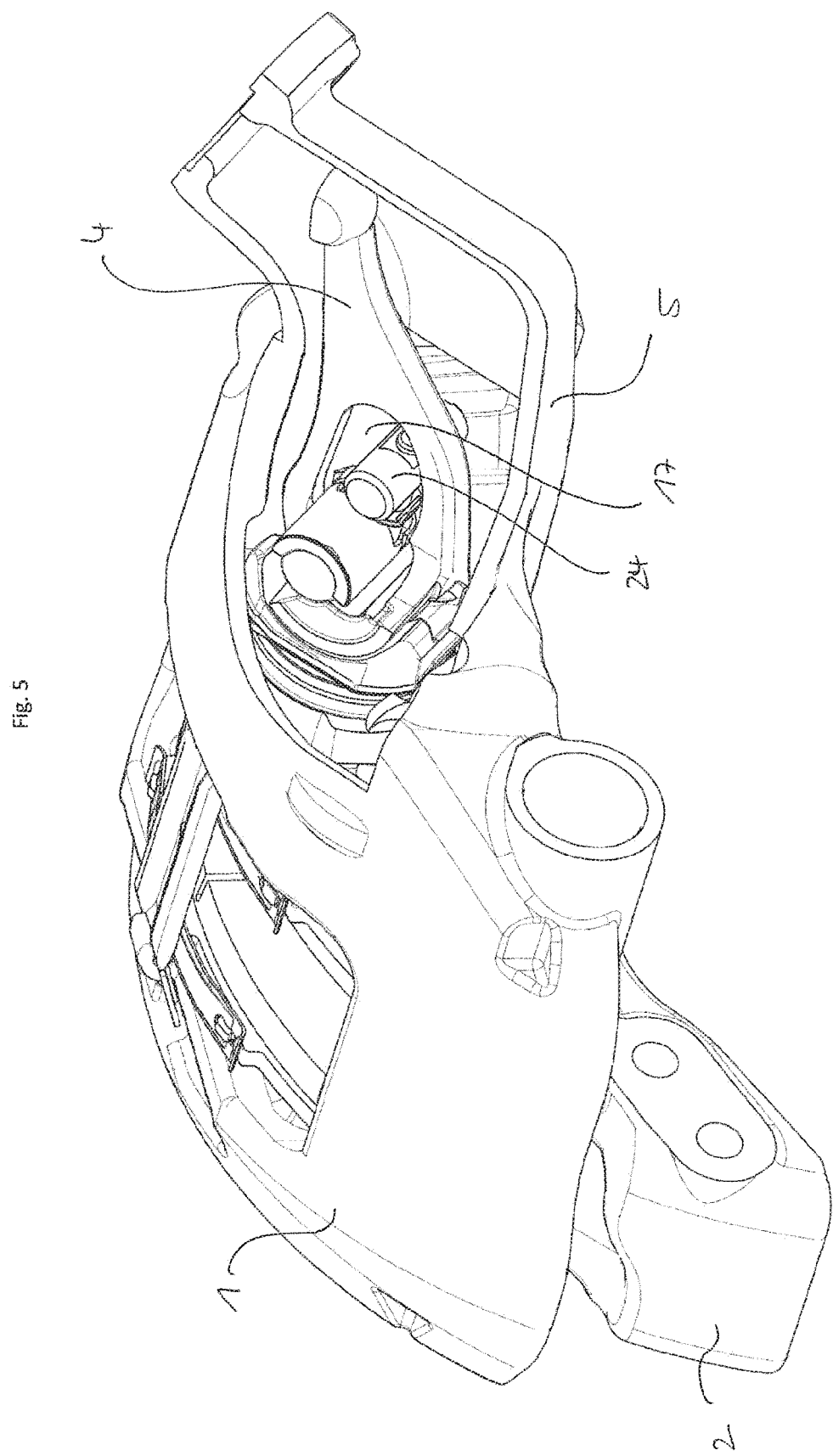
FIG. 5 is a further perspective, partially cut-out view of a brake caliper containing a brake actuation mechanism with a brake lever according to the invention showing a different angular position of the brake lever.

In order to adapt to spatial needs resulting from constraints in the surroundings of the disc brake, in particular with respect to the arrangement of the external actuator, the lateral opening 25 and the inner recess 26, in aligned orientation, could be arranged angularly offset to the horizontal or vertical plane being defined in relation to the axis of the brake disc. By that the brake lever 4 can be also arranged at corresponding angular positions, which is indicated in FIG. 5.

This is particularly enabled in that the entire brake actuation mechanism 3 according to the invention is, by the majority, rotationally symmetrically orientated around the central rod 20. Since furthermore the force-transmitting block 10 does abut against the thrust element 11 (or components thereof) in a planar way, it is enabled to rotate the brake lever 4 with the single components of the amplification mechanism 7 with respect to the rod 20 and with respect to the axially linearly guided thrust element 11 and fix the brake lever 4 with the amplification mechanism 7 in the desired angular position. This also requires corresponding modifications to e.g. the traverse housing section 15.

Figure 6:
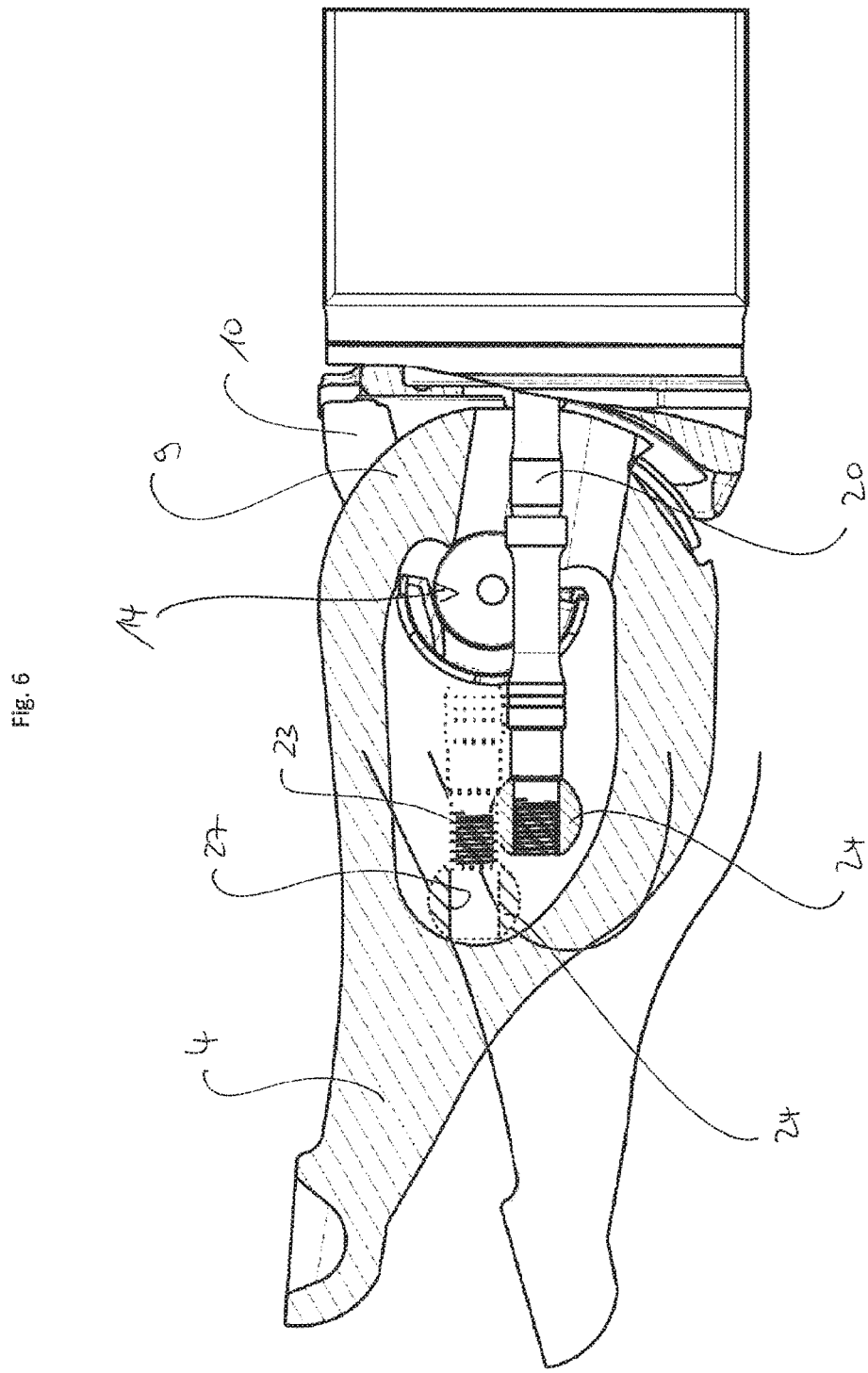
FIG. 6 schematically shows different steps of a method of assembly.

As an example, FIG. 6 schematically shows the different positions of the mounting state for a mounting brace 24 and a rod 20 entering into a threaded engagement.

The brake actuation mechanism 3 with the thrust element 11 being taken off will be inserted as a first unit into the interior of the brake caliper 1, after the mounting brace 24 has been laterally inserted through the lateral opening 25 in the caliper 1 and received by the inner recess 26 in such a way that the threaded passage 27 in the mounting brace 24 and the threaded end 23 of the rod 20 are in an aligned orientation.

A mounting tool (not shown), e.g. a common linear wrench or similar, will be attached to the brake-disc side end of the rod 20, which is correspondingly configured for that purpose. By rotating the tool, the rod 20 will be rotated and the end 23 will be screwed into the passage 27 of the mounting brace 24. Since the lateral opening 25 and the recess 26 serves as some kind of support or counter bearing in this respect, the entire brake actuation mechanism 3 will be fixedly mounted inside the caliper at the right axial position, when the rod 20 is completely screwed into the passage 27.

In order to finally mount the thrust element 11 as a second unit, which usually comprises an inner thread which engages with an outer thread of an adjustment spindle or sleeve of the adjuster device (not shown), a separate reset device is used.

In this respect, particular reference is made to International patent application no. WO 2011/113554 A2, both showing such reset device and the threaded interaction of the radially outer thrust element 11 and a radially inner adjustment spindle of the adjuster device.

The separate rewinding or reset device is actually provided so as to bring the adjustment device back into an axial position which enables the change of completely worn brake linings. The reset device is configured such that it can be actuated by a corresponding tool from the outside through a corresponding opening in the housing of the brake caliper 1. By simple turning a shaft of the reset device with a tool, a pinion being directly or indirectly in connection with the adjustment spindle, will be set into rotation, whereby the adjustment spindle can be rotated and due to the threaded engagement with the thrust element 11, the latter is drawn inside the brake caliper 1 till it has reached its final axial position corresponding to the idle mode of the brake actuation mechanism 3.

Figure 7A:
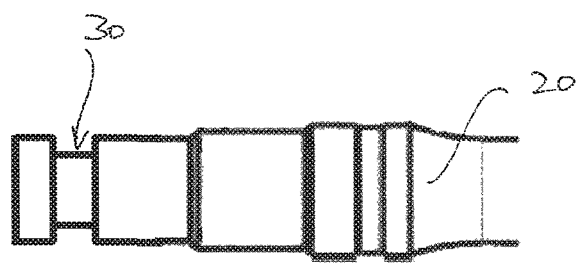
FIG. 7a schematically shows a rear-side end of the rod.
Figure 7B:
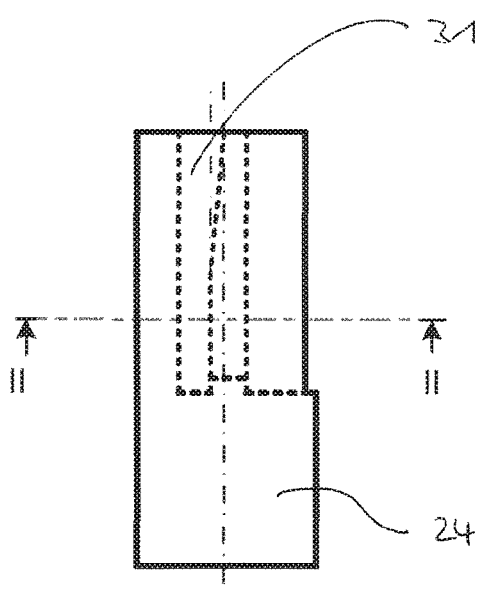
FIG. 7b schematically shows a mounting brace fitting with such rod.
Figure 7C:
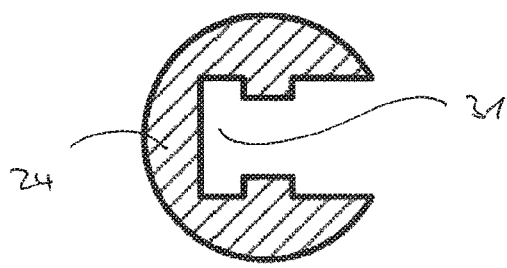
FIG. 7c shows a cross-section through said mounting brace.

An alternative engagement mechanism between the mounting brace 24 and the rod 20 is shown in FIGS. 7a-7c.

The rear end of the rod 20 comprises a radial groove 30 (FIG. 7a), while the mounting brace 24 comprises a correspondingly shaped recess 31 (FIGS. 7b, c), so that upon assembly the mounting brace 24 can be simply shifted onto the rear end of the rod 20 so as to match and then fix the rod 20 with the brake actuation mechanism 3 in the brake caliper 1, when the mounting brace 24 is received by the inner recess 26.

According to a preferred embodiment, the shaped recess 31 of the mounting brace 24 is tapering so that during the shifting process the rod 20 will be pulled further to the inside of the 30 brake caliper 1.

The dimensioning of the shaped recess 31 shall be such, that upon assembly and engagement with the rear end of the rod 20, a spring element of a return mechanism, which automatically shall bring the brake actuation mechanism 3 back into its starting position, once no more brake force is applied, will be set under a predefined pretension. Also in this respect, particular reference is made to International patent application WO 2011/113554 A2. A spring element, i.e. a coil spring, is arranged at the brake disc-side end of the rod and applies a spring force, which on the one hand shall serve to apply a defined preload onto a torque clutch of the adjustment device thereby defining a desired torque limit and on the other hand shall serve to apply a return force for the entire brake mechanism, once the brake pads lose contact with the brake disc.

According to the present invention, the configuration of both the mounting brace 24 and the rod 20 shall be such that such torque limit and/or such return force will be automatically created, after the brake actuation mechanism 3 has been finally mounted in the brake caliper 1.

LIST OF REFERENCE NUMERALS

1 Brake caliper
2 Carrier
3 Brake actuation mechanism
4 Brake lever
5 Rear extending housing section
6 Actuator connection means
7 Amplification mechanism
8 Rollers
9 Transmission means
10 Force-transmitting block
11 Thrust element
12 Needle bearing cage
13 Support cups
14 Eccentric pivot bearing
15 Traverse housing section
16 Needle bearing cup
17 Recess of lever
18 Lever arm part
19 Opening in traverse housing section
20 Rod
21 Opening
22 Opening
23 Threaded end of rod
24 Mounting brace
25 Lateral opening in caliper
26 Lateral recess in caliper
27 Threaded passage in mounting brace
28 Counter-screw
29 Sealing plug
30 Radial groove
31 Tapered recess in mounting brace

The invention claimed is:

1. A disc brake comprising a brake caliper, which overlaps at least one brake disc, and a brake actuation mechanism having:
   an amplification mechanism comprising a brake lever being rotatable around a pivot bearing for introducing a clamping force from an actuator, the brake lever having an arm extending between an actuator connection means and a transmission means,
   a thrust element in connection with said transmission means for transmitting the amplified clamping force onto the brake disc,
   wherein the brake lever comprises a recess between the actuator connection means and the transmission means, which recess is traversed by the axis of said pivot bearing,
   a rod extending between the amplification mechanism and the thrust element,
   a mounting brace having means for receiving the rod, and an inner recess on the brake caliper adapted to receive one end of the mounting brace and an opening opposite to the inner recess.

2. The disc brake of claim 1, in which the brake lever is configured and arranged in relation to the thrust element so that the clamping force from the actuator is substantially directed perpendicularly to the axis of the brake disc upon brake actuation.

3. The disc brake of claim 1, in which the amplification mechanism and the thrust element are mounted in functional cooperation in the brake caliper by means of the rod that is supported in the housing of the brake caliper so as to be non-displaceable in an axial direction.

4. The disc brake of claim 3, in which the rod extends into said recess.

5. The disc brake of claim 4, wherein said mounting brace traverses said recess.

6. The disc brake of claim 5, in which the means for receiving said rod is configured to allow a force-fit and/or form-fit with the rod.

7. The disc brake of claim 5, in which the mounting brace is releasably fixed in the brake caliper.

8. The disc brake of claim 7, wherein the opening is adapted to allow insertion of the mounting brace into the brake caliper.

9. The disc brake of claim 4, in which the brake lever is configured to be mounted at different angular positions around the axis of the rod.

10. A method for manufacturing a disc brake, which comprises a brake caliper, which overlaps at least one brake disc, and a brake actuation mechanism having:

an amplification mechanism comprising a brake lever being rotatable around a pivot bearing for introducing a clamping force from an actuator, the brake lever having an arm extending between an actuator connection means and a transmission means, in which the brake lever further comprises a recess between the actuator connection means and the transmission means, for transmitting the amplified clamping force onto the brake disc, wherein the amplification mechanism with the brake lever and the pivot bearing are mounted in functional cooperation as a self-supporting first unit by means of a rod;

comprising the steps of:

inserting the first unit into the brake caliper through an opening from the brake disc-side;

inserting a mounting brace through a lateral opening in the brake caliper such that the mounting brace traverses the recess of the brake lever;

connecting the end of the rod, the end facing the rear of the brake caliper, with the mounting brace.

11. The method of claim 10, in which the mounting brace comprises a threaded passage and the end of the rod comprises a thread, further comprising the steps of:

applying a rotatable mounting tool at the side of the rod being axially opposite to its threaded end; and rotating the rod so as to screw its threaded end into the threaded passage of the mounting brace.

12. The method of claim 10, further comprising the steps of:

attaching a second unit comprising the thrust element to the brake disc-side end of the first unit, the thrust element comprising an inner thread and the brake disc-side end of the first unit comprising an outer thread; and activating a reset device being in connection with the first unit thereby screwing the second unit onto the first unit.

13. A method for manufacturing a disc brake, which comprises a brake caliper, which overlaps at least one brake disc, and a brake actuation mechanism having:

an amplification mechanism comprising a brake lever being rotatable around a pivot bearing for introducing a clamping force from an actuator, the brake lever having an arm extending between an actuator connection means and a transmission means, in which the brake lever further comprises a recess between the actuator connection means and the transmission means, which recess is traversed by the axis of said pivot bearing;

a thrust element in connection with said transmission means for transmitting the amplified clamping force onto the brake disc, wherein the amplification mechanism with the brake lever and the pivot bearing and the thrust element are mounted in functional cooperation as a self-supporting unit by means of a rod;

comprising the steps of inserting the unit into the brake caliper through an opening from the brake disc-side;

inserting a mounting brace through a lateral opening in the brake caliper such that the mounting brace traverses the recess of the brake lever; and connecting the end of the rod, the end facing the rear of the brake caliper, with the mounting brace thereby enabling a form-fit and/or a force-fit.

14. The method of claim 13, the rod comprising engagement means and the mounting brace comprising engagement means being complementary therewith, further comprising the step of:

laterally shifting the mounting brace over the end of the rod thereby bringing the engagement means of both the mounting brace and the rod into engagement.

15. The method of claim 14, the brake actuation mechanism further comprising an adjustment mechanism and a reset device cooperating with said adjustment mechanism, the reset device comprising a return spring element, wherein the adjustment mechanism, the reset device with the spring element, the amplification mechanism with the brake lever and the pivot bearing and the thrust element are mounted in functional cooperation as a self-supporting unit by means of said rod, further comprising the step of:

displacing the rod in axial direction upon laterally shifting said mounting brace over the end of the rod, and thereby applying a defined pretension to said return spring element.

\* \* \* \* \*